US006093101A

United States Patent [19]
Mourad

[11] Patent Number: 6,093,101
[45] Date of Patent: Jul. 25, 2000

[54] GAMING APPARATUS INCLUDING SLOT MACHINE

[76] Inventor: Raphael Mourad, 25 Flamingo Road, Thornhill, Ontario, Canada, L4J 6Z5

[21] Appl. No.: 09/019,420

[22] Filed: Feb. 5, 1998

[30] Foreign Application Priority Data

Aug. 5, 1997 [CA] Canada .................................. 2212305

[51] Int. Cl.[7] ................................................ A63F 13/00

[52] U.S. Cl. ................................................................ 463/13

[58] Field of Search .......................... 463/12, 13, 16–22, 463/48; 273/143 R, 138.1, 138.2, 139, 142 R, 142 H, 142 HA, 142 E, 142 F, 142 G, 274, 269, 309

[56] References Cited

U.S. PATENT DOCUMENTS 4,364,567 12/1982 Goott .
4,396,193 8/1983 Reinhardt et al. .
4,614,342 9/1986 Takashima .
4,792,137 12/1988 McKechnie .
4,805,907 2/1989 Hagiwara .
4,813,675 3/1989 Greenwood .
5,106,091 4/1992 Comito .
5,116,055 5/1992 Tracy .
5,184,821 2/1993 Korenek .
5,221,083 6/1993 Dote .
5,263,715 11/1993 Matsumoto et al. .
5,490,670 2/1996 Hobert .
5,630,586 5/1997 Lowden .
5,669,817 9/1997 Tarantino .
5,831,527 11/1998 Jones, II et al. .
5,964,463 10/1999 Moore, Jr. .

FOREIGN PATENT DOCUMENTS 1317470 12/1989 Japan .

*Primary Examiner*—Valencia Martin-Wallace
*Assistant Examiner*—John Paradiso

[57] ABSTRACT

A game apparatus for a gambling-type game includes a playing table having a plurality of marked areas on an upper surface thereof, these areas being indicative of various betting options, including several different types of bets. The apparatus includes a slot machine having a number of reels with a number of indicia on each reel. Preferably there are four reels, each with a series of numbers from 1 to 6. An electrical control arrangement permits the slot machine to be operated from any one of a number of different playing positions around the table. Electric lights are arranged below the surface of the table in the marked areas for indicating possible betting options and which bets have won or lost as a result of a particular spin of the machine. A computer or microprocessor is provided for determining the results of any spin of the machine and for determining which betting options have won or lost.

29 Claims, 6 Drawing Sheets

GAMING APPARATUS INCLUDING SLOT MACHINE

BACKGROUND OF THE INVENTION

This invention relates to game apparatus and particularly such apparatus designed for a gambling game that includes a playing table. The invention further relates to slot machines and equivalent electronic gambling machines.

Conventional slot machines are well known and have been in use for a number of years in jurisdictions permitting the use of these machines. They include mechanically operated types in which reels are mechanically rotated to move and eventually stop to display a row of symbols. Each reel has a number of symbols illustrated thereon and arranged about its circumference. There are also video type slot machines in which the symbols are displayed on a CRT screen and are moved or changed by an electronic control system.

Known slot machines can have three, four or more reels. These known machines are generally played by one player alone and thus players of these machines tend to be isolated from one another. Thus, there would be advantages in providing a slot machine or similar gambling machine system which would involve a number of players playing the same machine or the same machine system in order to make play more enjoyable. Also, existing slot machines, because of their relative simplicity can become boring to play after a period of time and a more complex gambling machine involving different types of bets that can be placed by any player would be desirable.

SUMMARY OF THE INVENTION

The game apparatus described herein can be used to play a gambling game that is fun to play and exciting. The apparatus is particularly suitable for casino gambling wherein a fairly large number of players are available at any time. The preferred embodiment of the apparatus described herein can accommodate fourteen players at once and would normally be operated by three persons that can be employees of the casino. The apparatus includes a single slot machine having a number of reels, for example, four, with a number of indicia on each reel. In the described preferred slot machine, each reel has a series of numbers from 1 to 6 uniformly distributed thereon.

The game apparatus described herein and the gambling game that can be played with this apparatus will be attractive to a wide variety of gamblers since it has features that are common to many currently played casino games including poker, craps and blackjack and features that are common to slot machines now used in casinos. The game apparatus of the present invention combines features of table games and slot machines into a single game apparatus.

Although a particular game apparatus is described hereinafter, the various novel features of this apparatus have broad applications with respect to the variety of possible game apparatus that can be constructed and that can incorporate these features. It will be readily apparent to those skilled in gambling-type games that a number of different types of games involving the use of a slot machine can be made which will incorporate one or more of the features of this invention.

According to one aspect of the invention, a game for playing a game involving a human game controller and a number of players apparatus comprises a slot machine having plurality of a reel with a plurality of indicia on each reel, and a playing table having a plurality of respective playing positions for the players and a controller's position. The table has a plurality of marked areas on a playing surface on which bets can be placed, these areas being indicative of various betting options that can be placed by the players and that are based on the possible results of a spin of the slot machine. There is also an electrical controller for operating the slot machine from any of the playing positions and from the human controller's position.

Any selected single player and the human controller are each able to spin all of the reels simultaneously by operation of the electrical controller from their respective positions when, during the course of the game, it is a player's turn or the human controller's turn, to spin the reels.

According to another aspect of the invention, a game apparatus includes a random output generator and display system for generating simultaneously a plurality of outputs selected from predetermined set of possible outputs, and displaying the plurality of outputs. The apparatus includes a playing table having a number of playing positions for game players, and a position for a human controller the table having a plurality of marked areas on a playing surface, these areas being indicative of various betting options that can be won by the players and that are based on the possible outputs of the random output generator and display system. Also included is an electrical controller for operating the random output generator and display systems from any one of the playing positions and from the controller's position. Any select single player and the human controller are each able to generate all of the plurality of outputs simultaneously by the operation of the electrical controller from their respective positions when it is his or her respective turn during the course of the game.

According to still a further embodiment of the invention, a game apparatus comprises a slot machine having four reels with each reel having a numerical sequence displayed around its circumference, and a playing table for a plurality of playing positions for the players and a position for a human controller. The table has a plurality of marked areas on a playing surface on which chips or markers can be placed. These areas are indicative of various betting options that can be won by a player by a spin of the slot machine. The indicia displayed by the reels at the completion of each spin can match one or more of the betting options shown on the marked areas.

This game apparatus also includes an electrical controller for operating the slot machine from any one of the playing positions around the table and from the controller's position. Any selected single player and the controller are each able to spin all four reels simultaneously by operation of the electrical controller from their respective positions.

Further features and advantages will become apparent from the following detailed description taken in conjunction with the accompanying drawings.

DESCRIPTION OF THE PREFERRED EMBODIMENT

Figure 1:
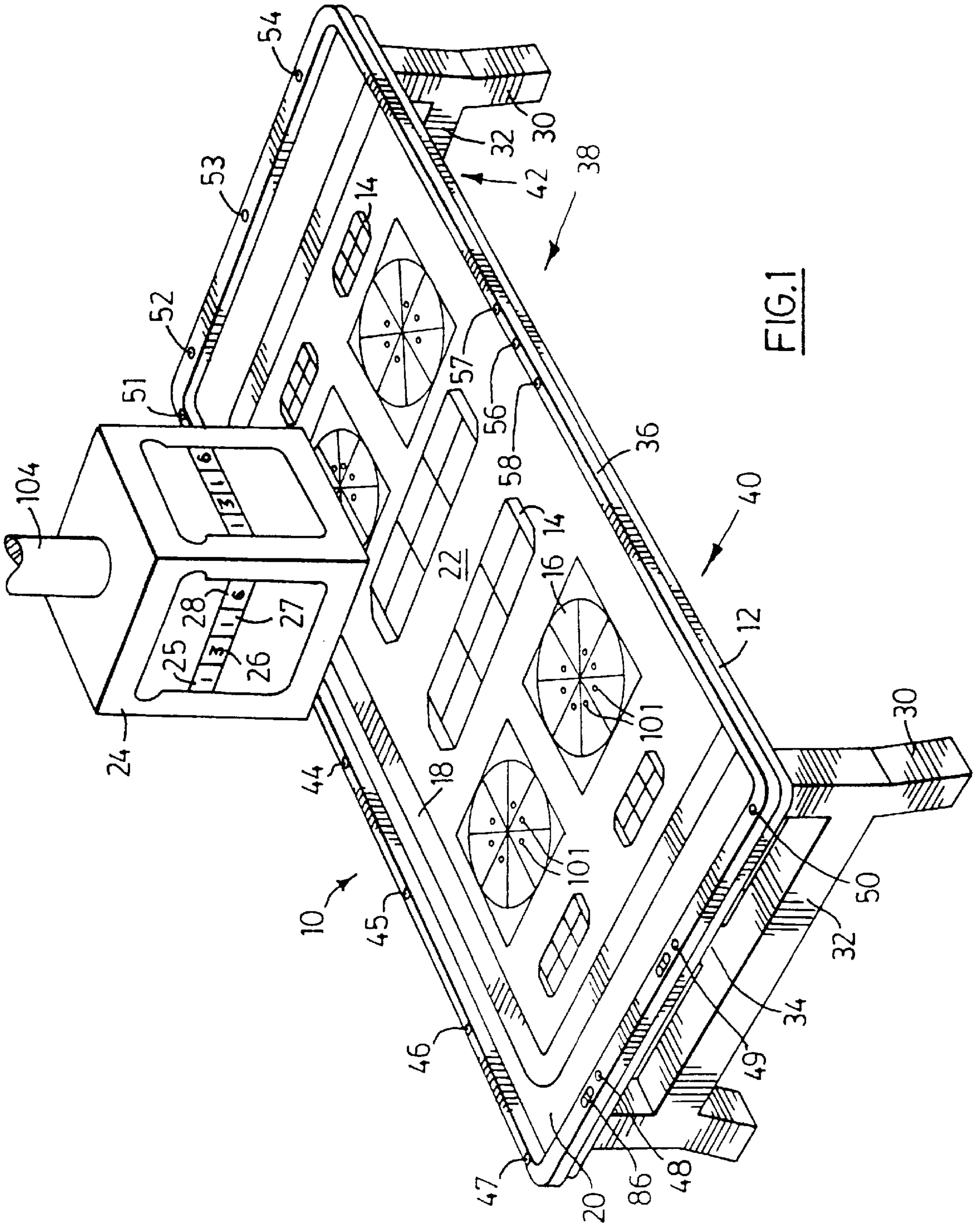
FIG. 1 is a perspective view of a game apparatus constructed in accordance with the invention, this apparatus being viewed from above and from one end.
Figure 2:
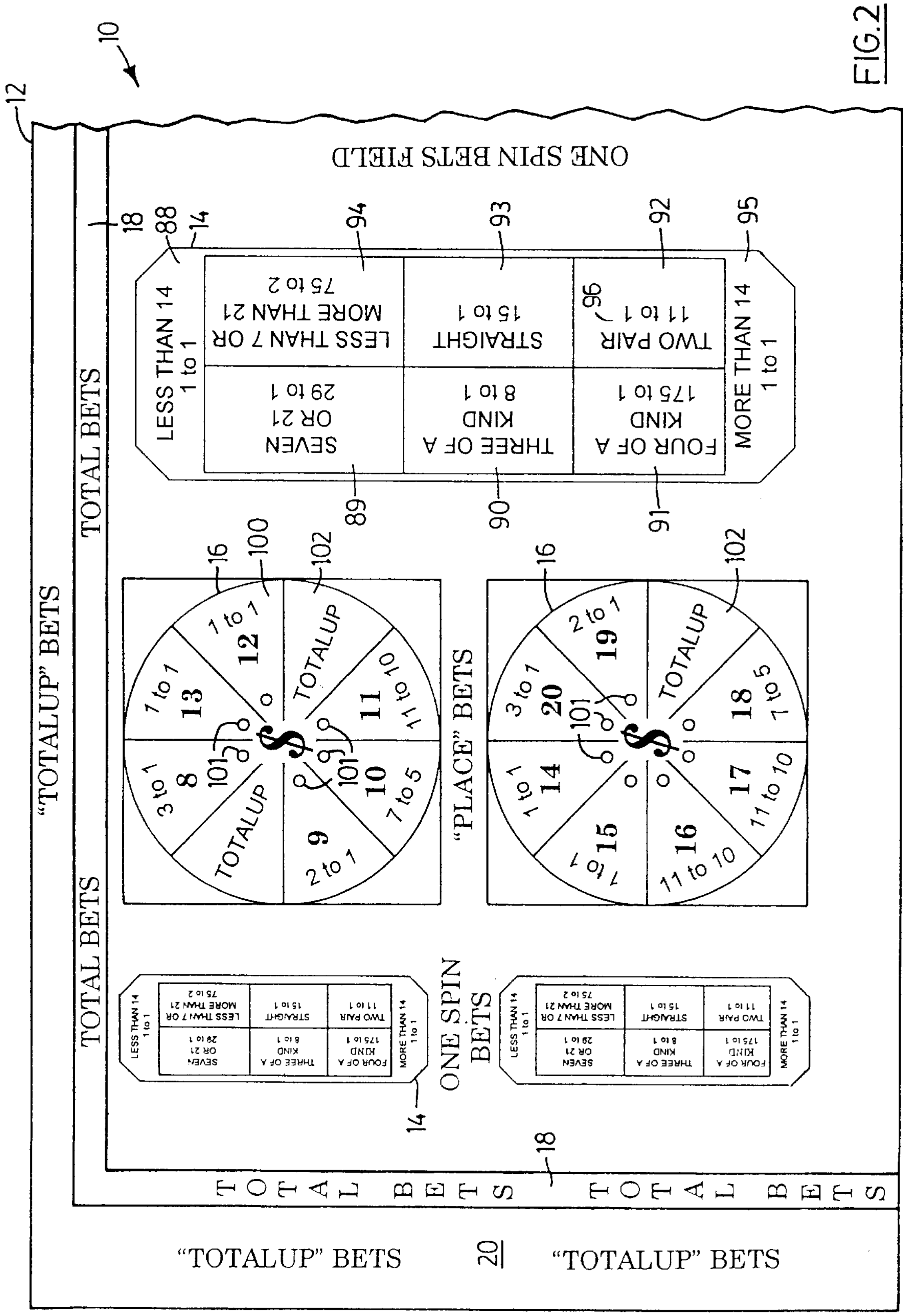
FIG. 2 is a plan view of one half of the top of a preferred playing table showing the marked areas thereon.

A preferred game apparatus 10 constructed in accordance with the present invention is illustrated in FIGS. 1 and 2. This apparatus includes a playing table 12 having a plurality of marked areas 14, 16, 18 and 20 on an upper surface 22 thereof. The four different areas 14 to 20 are indicative of various betting options that are explained in detail hereinafter. The apparatus includes a special slot machine 24 which can be hung from the ceiling of the room as shown in FIG. 1 or supported in some other suitable manner, such as by the table itself. Although the preferred illustrated slot machine 24 has four vertical sides, only two of which are shown in FIG. 1, with each of these sides displaying the results of each spin of the slot machine, it will be appreciated that a standard slot machine configuration displaying the results on only the front side thereof can also be used in conjunction with the apparatus of this invention. In a mechanical version of the slot machine 24, the machine has a number of reels indicated at 25 to 28 in FIG. 1 with a number of indicia on each reel. In the preferred embodiment, the indicia on each reel comprise a series of single digit numbers, namely the numbers 1 to 6 which are displayed about the cylindrical circumference of the reel.

The illustrated preferred table structure includes four table supporting legs 30. The pair of legs 30 at each end of the table can be connected together by horizontal frame member 32. For further support, a longitudinally extending central frame member 34 (only the end of which is shown in FIG. 1) can extend between the centre of the two frame members 32. A suitable gaming table rim 36 can extend about the perimeter of the table top which, as shown, is rectangular in plan view but other table top shapes are quite possible. The top surface of the gaming table rim 36 is preferably 4" to 6" higher than the upper surface 22 of the table 12. In a particularly preferred embodiment, the table 12 is large enough to accommodate 14 players plus a game controller who may be seated in the central region indicated at 38 and two game dealers who may position themselves in the regions 40 and 42. Thus, there can be one dealer responsible for each half of the table and these dealers are located on opposite sides of the centrally located controller.

As explained further hereinafter, each of the possible fourteen players is provided with his or her own push button which gives the player the capability of spinning the slot machine 24 when it is his or her turn. A number of these push buttons can be seen in FIG. 1. Assuming that the players are numbered from 1 to 14, the push buttons for players 1 to 7 are indicated at 44 to 50 and these buttons are located on the left half (as seen in FIG. 1) of the table. Similarly, seven player buttons are also located on the right half of the table with the buttons for players 11 to 14 being visible at 51 to 54. The buttons for the remaining three players on the right half of the table are not shown in FIG. 1. The aforementioned controller has three buttons indicated at 56 to 58 in FIG. 1 that the controller uses during the course of the gambling game as explained hereinafter. The button 56 is used to reset the table 12 during the course of the game and after each spin of the machine 24 while the button 57 is used by the controller to spin the slot machine 24 when required during the course of the game. The third button 58 is used by the controller to transfer control of the slot machine 24 to one of the players whose turn it is to spin the slot machine. It will be understood that these control buttons together with the players' buttons including buttons 44 to 50 and 51 to 54 and the electrical circuitry for connecting same to the slot machine constitute electrical control means for operating the slot machine 24 and these means enable the machine to be operated from any one of a number of different playing positions around the table. The required electrical circuitry is explained in more detail hereinafter.

The preferred playing table 12 is equipped with lighting devices in at least some of the marked areas 14, 16, 18 and 20 for lighting up the respective marked areas when the lighting devices are switched "on". If desired, these lighting devices can flash when they are switched "on" or switched to a flash position.

Figure 3:
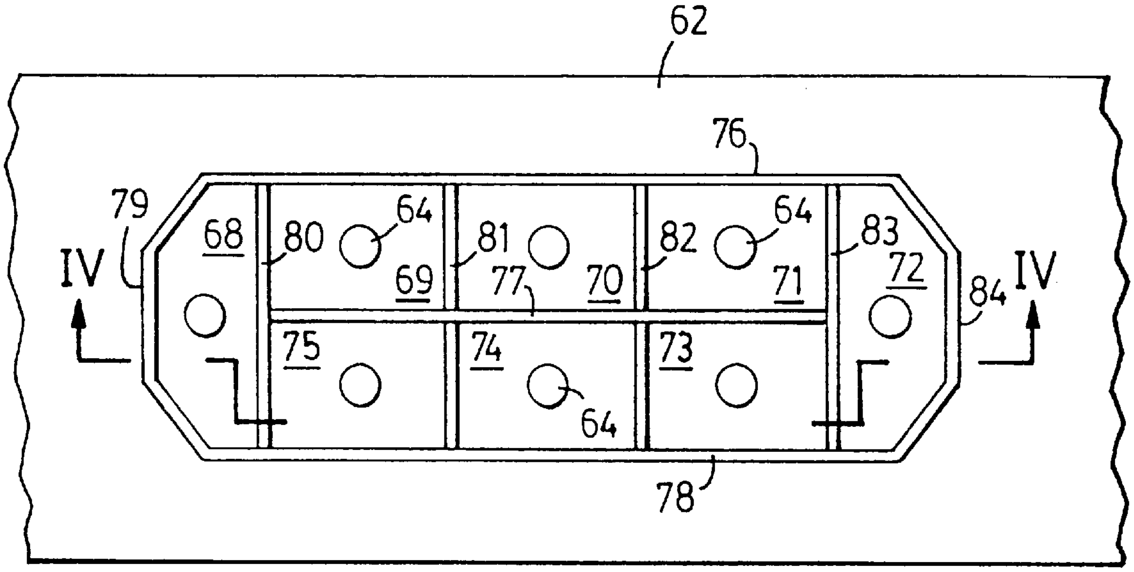
FIG. 3 is a detailed plan view showing the lighting devices for one marked area with the translucent sheet forming the upper surface of the table removed in order to show he lighting devices.
Figure 4:
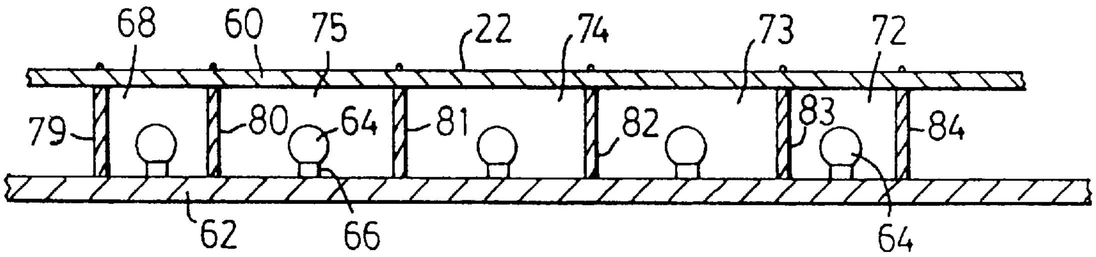
FIG. 4 is a cross-sectional detail taken along the line IV—IV of FIG. 3 showing the lighting devices arranged below one marked area of the table.

The structure of the table which enables these marked areas to be lit up will now be explained in more detail with particular reference to FIGS. 3 and 4. Although these two figures show a lighting arrangement for the marked area 14 of which there can be several on the table, it will be appreciated that similar lighting devices with a similar mounting arrangement can be used for the other marked areas on the table 12 including areas 16, 18 and 20. The flat upper surface 22 of the table is made of a translucent material such as a suitable translucent plastic which can be in the form of horizontal plastic panel 60. The entire table top 22 can be formed with a single large panel but preferably it will be formed with at least several smaller panels placed edge to edge, making access to the area below the panels easier for repairs or maintenance. The translucent panel or panels 60 are spaced a short distance above a rigid bottom panel 62 which can be made of wood or metal. If desired, a rigid support framework (not shown) can be provided below the panel 62 in order to give the table the necessary overall strength and rigidity. A number of lighting devices such as light bulbs 64 are mounted on the panel 62 directly below the marked area of the table top. The bulbs 64 can be mounted in suitable sockets 66 which per se can be of standard construction. As shown, each socket is mounted centrally in its own compartment which is defined by vertical wall members that extend between the bottom panel 62 and the translucent panel 60. For the illustrated marked area 14, there can be eight such compartments indicated at 68 to 75. Compartments 69 to 71 and 73 to 75 are rectangular in plan view while end compartments 68 and 72 have six vertical sides. The various walls which form the compartments including longitudinal walls 76, 77 and 78 and transverse walls 79 to 84 are constructed of an opaque material such as an opaque plastic and these walls are arranged so that the tops thereof conform with and are aligned with the boundary lines and inside lines that form the marked area 14. As explained hereinafter, an electrical system is provided for operating appropriate ones of the lighting devices 64 by switching them "ON" after a spin of the slot machine 24 in order to indicate which betting options have won on that particular spin.

In one preferred embodiment, when the table is reset, the lighting devices 64 are generally lit in the areas of the table that are active (active meaning that bets can be or have been placed on such areas). After the spin, the electrical system causes these lighting devices to "flash" in order to indicate which betting options have won and to turn off in order to indicate which betting options have lost. This electrical system includes means for determining the results of any spin of the slot machine 24 and generating electrical signals indicative thereof and computer or microprocessor means for determining which betting options have won on the basis of the spin results.

The various betting options available to players using the preferred game apparatus shown in FIGS. 1 and 2 will now be explained. It will be understood that each of the players is provided with his or her own different coloured chips which can be held in a suitable chip rack 86 arranged along the table edge. The players can place their bet on their own or with the assistance of the two dealers. During the course of the preferred gambling game explained hereinafter, the players can place bets on four different marked areas located on the upper surface 22 of the playing table. The areas 16 are for so called "Place" bets which are based on a spin result ranging from 8 to 20. The marked areas 14 of which there may be several are of so called "One Spin" bets. The area 18 which extends around three sides of the table as shown is for a "Total" bet. Finally, the marked area 20 which again extends around three sides of the table including one of the long sides, is for a so called "Totalup" bet. After each spin of the slot machine 24, the winning marked area on the table or the winning portion thereof preferably flashes by means of the aforementioned bulbs 64 and the electrical system that controls these lights.

"PLACE" and "ONE SPIN" BETS

With respect to the "One Spin" bets, there are eight different types of this bet that can be made in the preferred illustrated game. The marked area 14 is divided into "card game" betting sections 88 to 95. These sections have indicia 96 to indicate certain types of card hands or poker hands that can arise from dealt cards from a deck of playing cards normally used for the game of poker. The indicia on the slot machine reels 25 to 28 (whether they be the preferred series of numbers from 1 to 6 or other indicia corresponding to standard playing cards) are used to represent various possible card combinations. Thus, the results of a spin of the slot machine 24 can be used to determine if one or more of these betting sections have won. In the illustrated game apparatus, the eight betting sections provide the following types of card or poker type bets:

| SECTION OF MARKED AREA | TYPE OF POKER OR CARD-TYPE BET |
|---|---|
| 88 | Less than 14 |
| 89 | 7 or 21 |
| 90 | 3 of a kind |
| 91 | 4 of a kind |
| 92 | 2 pair |
| 93 | Straight |
| 94 | Less than 7 or more than 21 |
| 95 | More than 14 |

During the use of the apparatus 10, the "One Spin" marked areas 14 are always active. In other words, a player is able to place a bet in the marked areas 14 for spins either by the controller or by a player. The "One Spin" bets field is independent of bets outside this field. Thus, a player will win in this area if the outcome of a spin shows the combination bet on and will lose if the outcome is different. The areas 14 normally have their light bulbs 64 turned on in the preferred apparatus and these bulbs will flash in any winning section of this area after a spin. The lights of losing sections of area 14 will turn off after a spin of the machine.

With respect to the Place bets which are made in one of the marked areas 16, each of which can be circular as shown, the bets in these areas are active only when the slot machine 24 is spun by one of the players (not the controller of the game). One or more of the marked areas 16 (in the version illustrated in FIG. 2, a combined two of the marked areas 16) is divided into betting sections, one of which is indicated by reference 100, that are numbered respectively from 8 to 20. The number on each betting section 100 represents a possible sum total of the numerical results on all of the reels arising from one spin of the slot machine 24. Such totals can be achieved if the reels are each numbered from one to six. One of the betting sections 100 is caused to flash by a respective one of the lighting devices below the two combined areas 16 when the sum total of the numerical results on all of the reels arising after a non "Totalout" spin (see below for definition) by a player corresponds to the number of that one betting section. As shown in FIG. 2, in addition to the sections numbered from 8 to 20, there are three similar sections 102 that can be labelled "Totalup". With these additional three sections, the total number of pie-shaped sections in each area 16 is 8. For reasons which will be explained below, each of the pie shaped betting sections 100 preferably includes a small, circular section, a number of which are indicated by reference 101. A lighting device is provided under each of the circular sections 101 so that each circular section 101 can light-up independent of and a different color then the betting section 100 in which it is located. In the illustrated table 12 of FIG. 1 there are two areas 16 laid out on each half of the table.

After a non "Totalout" spin by a player, the two dealers pay the winning spot or section in the areas 16 according to the prescribed payouts. The preferred payout for each section is preferably indicated thereon as shown in FIG. 2. If a player's spin is a "Totalout", then bets on this "Place" field are all collected by the dealers. In other words, all of the players will lose their bets in this field. The sections for "Place" bets are normally lit by the lighting devices and a winning section will preferably flash after a spin of the slot machine. All of the lighting devices below the areas 16 are turned off when the player's spin is a "Totalout".

In the preferred version of the game played with the apparatus 10, a "Totalout" spin is a spin with a total outcome (i.e. the sum of the numbers shown on the four reels) of less than 7 or more than 21 or less than a pair (unless one of the reels shows a "2"). The number "2" will be considered a match to any other number to form a pair provided that the outcome of the spin does not have a natural pair. For example, the spin (1, 3, 5, 6) is considered a "Totalout" spin as it is less than a pair (according to the rules of the game of poker). Thus a straight such as (3, 4, 5, 6) is not a "Totalout" as it is greater than a pair, and the spin (1, 2, 5, 6) is not a "Totalout" as it is considered to be a pair because of the number "2" showing up. The spin (6, 6, 6, 5) is a "Totalout" since the total is more than 21.

"TOTAL" AND "TOTALUP" BETS

The preferred game using the game apparatus 10 is commenced by the controller spinning the slot machine 24.

Before the controller does so, the players are asked to place their bets in the "Total" bet area 18. When these bets have been placed, the controller announces "no more bets" and spins the slot machine. If the controller's spin is a "Totalout" as defined above, the dealers will pay all of the players who have placed bets in the "Total" area at a ratio of 1 to 1. However, if the resulting spin outcome is a total of "7" or "21", the house wins and collects all of the betting chips in the "Total" area. If none of these events occur, however, then a "Totalup" point (one of the numbers 8 to 20) is established for purposes of the ongoing game. In one embodiment of the game apparatus 10, when a "Totalup" point is established, the sections 102 in the "Place" bets area 16 lights up. The circular section 101 within the betting section 100 that corresponds to the established "Totalup" point also lights up, thereby providing a visual indication of the "Totalup" point. The appropriate circular section 101 will remain lit until a new game begins. All players are then required to place an additional bet equal to at least four times their bet in the "Total" area 18 in the marked area 20 (the "Totalup" area) which extends along the outside of the area 18. Then, one of the player's operating buttons is activated by the controller by pushing the button 58. This player, who is called the "spinner" then gets his or her turn to spin the slot machine. If the spin results in a situation where a "Totalout" has not occurred, the "Totalup" point has not been matched, and the total result does not equal 7 or 21, then a standoff results and all bets in the "Total" area 18 and the "Totalup" area 20 remain on the table, the controller resets the table, and the player who was selected as the spinner again spins the reels. This continues until a "Totalout" occurs, or the "Totalup" point is matched, or the total result equals 7 or 21. If the spinner gets a total of "7" or "21" or matches the "Totalup" point, then the players are paid according to their bets. If the outcome of the spin is a "7" or a "21", the house pays only the "Total" bets in area 18 at a ratio of 1 to 1 and the "Totalup" bets in area 20 are neither lost by the players or won by the house. If the "Totalup" point is matched by the spin, then the house pays the bets in the "Total" area 18 at 1 to 1 and the bets in the "Totalup" area 20 according to the payoffs set out below in Table I (which are the same as the payoffs marked in area 16 of FIG. 2). However, if the player spins a "Totalout", all the chips on the table, excluding those on "one spin" bets, which are independently paid, are collected by the dealers as the house has won. Note that it is possible for the outcome of the spin to match the "Totalup" point but still result in the spin being a "Totalout" if the outcome is less than a pair and does not include a "2" (which can happen if the Totalup point is 13, 14, 15 or 16). In such cases, all the players lose their bets in the "Place", "Total" and "Totalup" betting areas.

Once all bets have been settled after a player spin results in a "Totalout" or a "7" or "21" or a "Totalup" point match, then a new game is commenced with the table being reset by the controller, who then spins the slot machine 24, and the above process repeats itself. Thus, each "Totalup" game commences with the controller spinning the reels until a "Totalup" point is established, after which a player spinner spins the reels until a "Totalout" or a "7" or "21" or a "Totalup" point match occurs, at which time the current game ends and a new "Totalup" game begins.

As mentioned above, once a "Totalup" point is determined in the game, the reels are spun by a selected player "spinner" rather than by the controller. Preferably, the player selected as the player spinner in one game will also act as the player spinner throughout subsequent games until that player spins a "Totalout", after which a different player is selected as the player spinner for subsequent games until that player spins a "Totalout" and so on. The order in which players are selected as the player spinner is determined on a consecutive basis by going around the table one player at a time.

TABLE I

| TOTAL OUTCOME | HOUSE PAYS |
|---|---|
| 8 | 3 to 1 |
| 20 | 3 to 1 |
| 9 | 2 to 1 |
| 19 | 2 to 1 |
| 10 | 7 to 5 |
| 18 | 7 to 5 |
| 11 | 11 to 10 |
| 17 | 11 to 10 |
| 16 | 11 to 10 |
| 12 | 1 to 1 |
| 13 | 1 to 1 |
| 15 | 1 to 1 |
| 14 | 1 to 1 |

Preferably the areas 18 and 20 for "Total" and "Totalup" bets are lit by their respective lighting devices after the table is reset and when those areas are active. The area 18 for "Total" bets flashes if the result of the player's spin is a "7" or a "21" or the "Totalup" point is re-established. The area 20 for "Totalup" bets flashes only when the "Totalup" point is re-established. All lighting devices under the areas 18 and 20 are turned off when the player's spin is a "Totalout" indicating that all bets in these areas have lost. Also, the lights under the "Total" area 18 will turn off if the controller's spin is a 7 or a 21. If the result of the controller's spin is a Totalout, the "Total" area 18 will flash.

There are 1,296 different combinations from spinning the above described four reel slot machine 24. Of these combinations, there are 15 combinations with an outcome of less than 7 and a further 15 combinations with an outcome of more than 21. There are also 96 combinations of outcomes constituting less than a pair. It will thus be appreciated that there are a total of 126 possibilities (15+15+96) which constitute "Totalout" spins. The following possibilities can also be calculated:

(i) There are six possibilities of getting "4 of a kind";

(ii) There are 40 possibilities of getting a total of "7" or "21";

(iii) There are 72 possibilities of getting a straight, such as (3, 4, 5, 2);

(iv) There are 96 possibilities of getting "2 pair"; and (v) There are 126 possibilities of getting "3 of a kind".

Table II set out below shows the preferred house pay offs for the various possible "One Spin" bets.

TABLE II

| ONE SPIN BET | HOUSE PAYS |
|---|---|
| Four of a kind | 175 to 1 |
| Less than 7, or More than 21 | 75 to 2 |
| Total of "7" or "21" | 29 to 1 |
| Straight | 15 to 1 |
| Two Pair | 11 to 1 |
| Three of a kind | 8 to 1 |
| More than 14 | 1 to 1 |
| Less than 14 | 1 to 1 |

In a preferred embodiment of this game apparatus, there is also provided a buzzer or ringing device 104 which will generate suitable different sounds at selected times. In FIG. 1 this buzzer 104 is shown mounted on a post above the slot machine 24 but it will be appreciated that the buzzer can be mounted at any suitable location in the area of the table such as under the table or below the slot machine. Preferably the buzzer can generate at least two different sounds, for example a buzz to indicate a losing spin (when bets on the "Total" area 18 are lost) and a ringing sound to indicate a winning spin (when bets on the "Total" area 18 are won).

Figure 5:
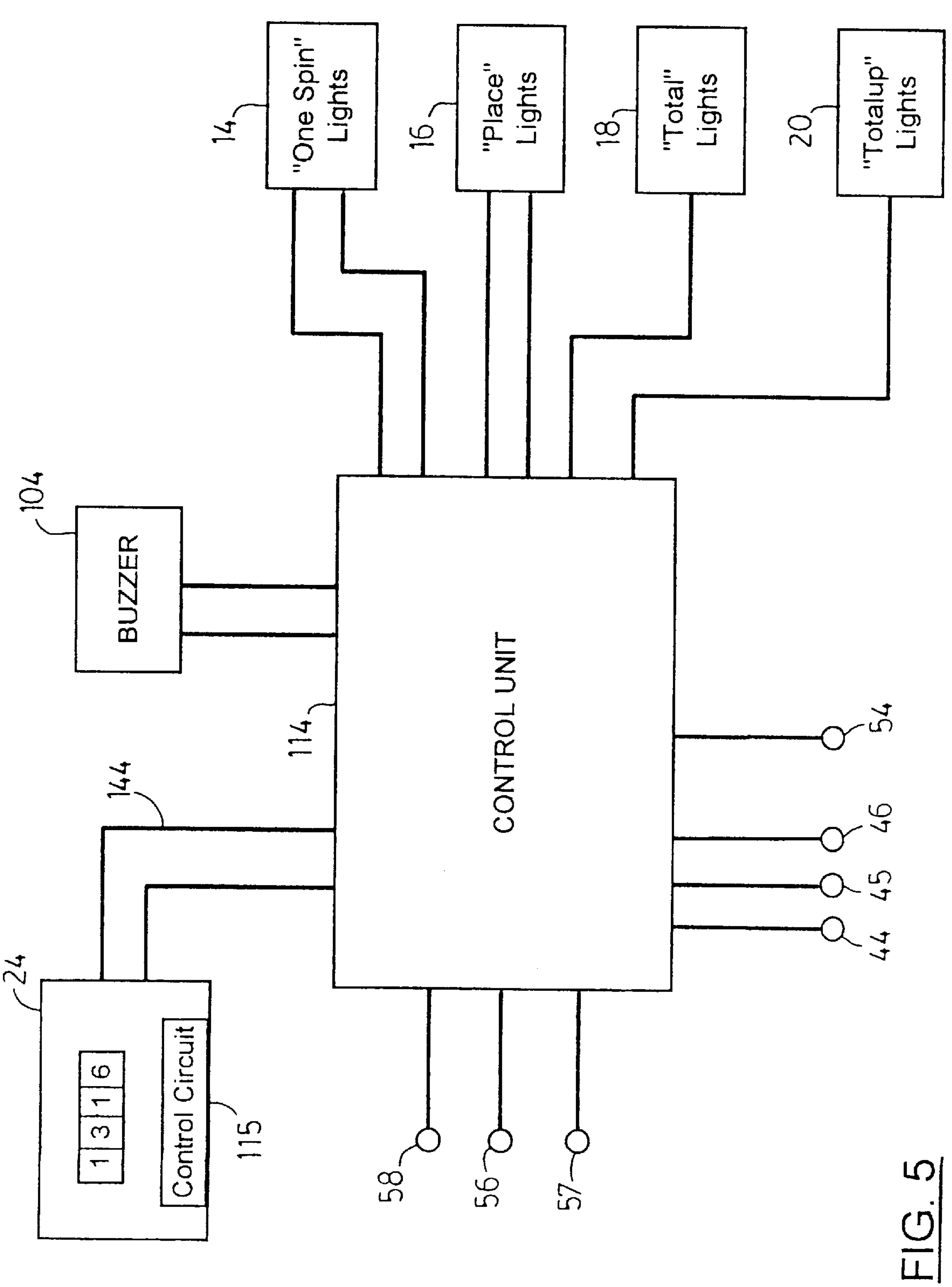
FIG. 5 is a block diagram schematic of the electrical circuit of the gaming apparatus.

FIG. 5 illustrates a simple block diagram schematic of the electrical system of the apparatus 10. In the preferred embodiment, a central control unit 114 controls the operation of the buzzer 104 and the lights contained in each of the various betting areas 14, 16, 18 and 20. The control unit 114 also controls, and is responsive to, each of the dealer buttons 56, 57 and 58, the player buttons 44 to 54 and the slot machine 24.

Figure 6:
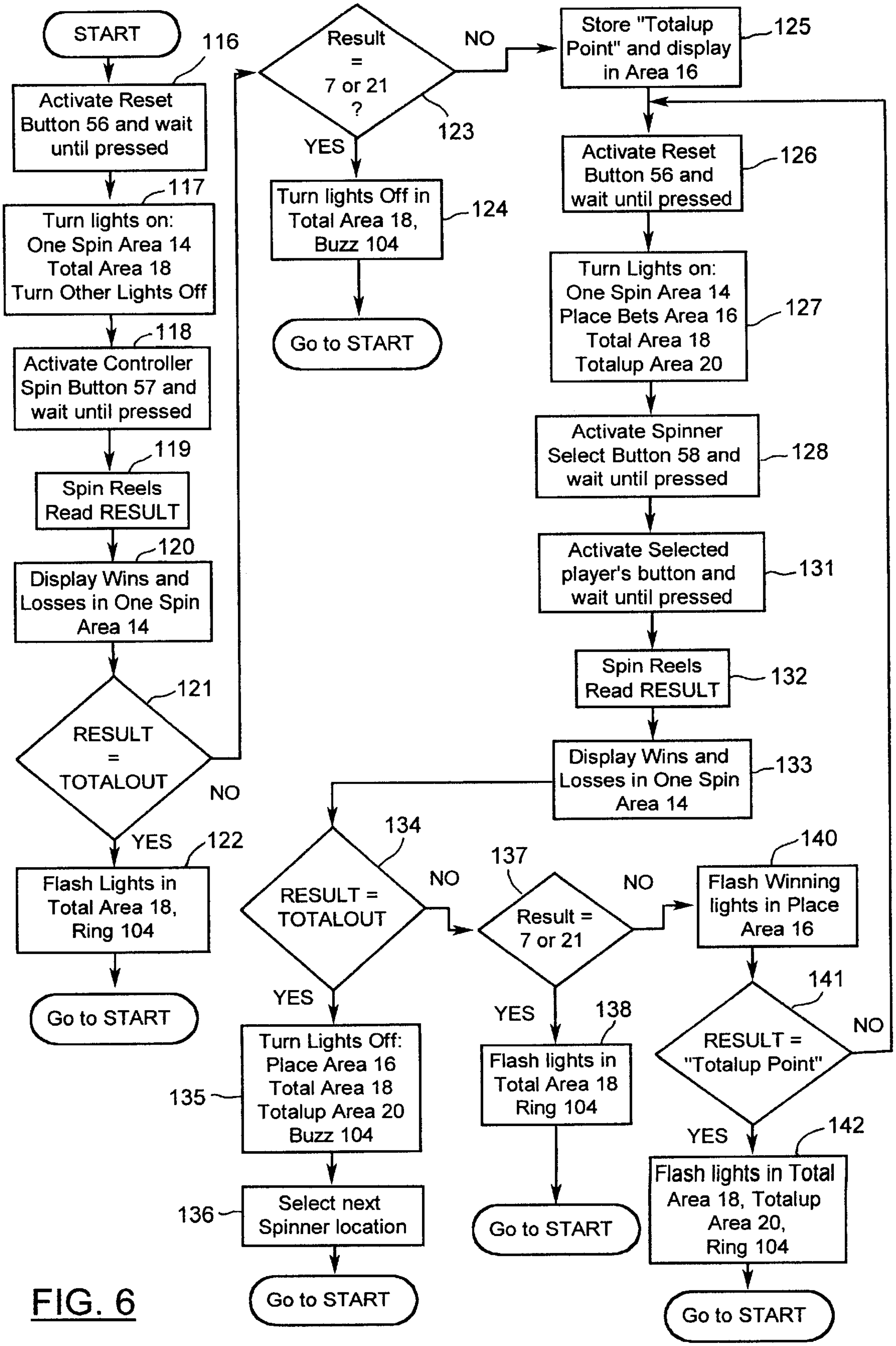
FIG. 6 is a flow chart of the operation of the electrical circuit of FIG. 5.

In one embodiment, the control unit 114 is essentially a microcomputer having a conventional CPU, RAM and ROM and one or more peripheral interface devices suitable for allowing the CPU to control and be responsive to the electrical components of the apparatus 10 shown in FIG. 5. The operation of the microcomputer of the control unit 114 is controlled by software stored in non-volatile memory of the microcomputer. FIG. 6 illustrates a flow chart describing the operation of the electrical system of FIG. 5 through a single game played on the apparatus 10. As indicated by the function block 116, at the start of each new game, the control unit 114 activates the controller's reset button 56 and then waits for the reset button 56 to be pressed. During this time the various lights on the table continue to display the results of the previous game so that the bets of the previous game can be collected and paid out. The controller 56 to 58 and player 44 to 54 buttons are operably connected to the CPU of the control unit 114 by one or more input/output interface devices of known construction. Each of the buttons includes an LED or similar light emitting element, and when the control unit 114 activates a button, electrical pulses are provided to the lighting element in the activated button, thus providing a visual indication that the button is activated. Each of the buttons contains a spring loaded electrical contact switch (which may be either normally closed or normally open) and depression of an activated button will cause an electrical signal to be supplied to the control unit 114.

Turning again to the function block 116, once the controller presses the activated reset button 56, as indicated by the function block 117, all lights in the "One Spin" area 14 and all lights in the "Total" area 18 are turned on and all other lights on the table are turned off, indicating that it is the controller's spin and thus bets can only be placed in the "One Spin" area 14 and the "Total" bet area 18.

As mentioned above, each of the lights in the preferred table have three different states, namely, "on", "off" and "flashing" (with the exception of the lights of the small circular sections 101, which have only an "on" and "off" state). Thus, the control unit 114 and the lights are configured so the control unit 114 can place each of the lights selectively in one of these states. Once the control unit 114 has placed a light in one of the possible states, it will maintain that light in that state until instructed (by its software) to do otherwise. The CPU of the control unit 114 is operatively connected to the lights of the display areas by one or more suitable interface devices.

Continuing down the flow chart of FIG. 6, as indicated by the function block 118, the control unit 114 activates the controller spin button 57 and waits for it to be pressed by the controller, who will do so once all bets are placed on the table. Once the controller presses the spin button 57, the control unit 114 responds by causing the slot machine 24 to spin its reels and generate a "RESULT" (the RESULT being the output of the slot machine 24). As mentioned above, in the preferred embodiment, the slot machine 24 includes four actual spinning reels. Thus, it is provided with one or more electrical motors and braking devices for spinning the reels and subsequently stopping the reels, as in conventional slot machines. In the preferred embodiment, the slot machine 24 includes its own control circuit 115 for controlling the operation of its motor and braking devices. Slot machine control circuits are well known in the art and it will be appreciated that one could be easily adapted for the present purpose.

The control circuit 115 is connected to the central control unit 114 by a suitable data transfer line 144. Upon receiving a control signal from the central control unit 114, the control circuit 115 causes each of the four reels to spin for a randomly determined length of time. The random length of time is determined individually for each of the reels so that the reels will generate a random outcome. The randomly determined spin time for each reel is calculated to fall within a predetermined range, say for example, 5 seconds to 10 seconds. The control circuit 115 of the slot machine 24 may include its own on board random number generator for calculating the random spin times or the random times may be determined by the central control unit 114 and provided to the slot machine control circuit 115 over the data transfer lines 144. Once the reels have stopped spinning, the outputs are read and the RESULT is transferred over the data line 144 to the control unit 114 where it is temporarily stored for processing.

It will be appreciated by those skilled in the art that electric or electromechanical means used in conventional slot machines to translate the post spin position of the reels into an electrical signal indicative of a numerical result are well known in the art, and the slot machine 24 makes use of such conventional technology to provide the RESULT to the central control unit 114.

With reference to function block 120, the central control unit 114 processes the RESULT to determine if there are any wins in the one spin bets field 14 and selectively causes the lights in the winning sections of the one spin area 14 to flash and extinguishes the lights in the losing sections of the one spin area 14.

It will be appreciated that the central control unit 114 can be easily programmed to process the RESULT to determine what winning combinations, if any, are present. The control unit 114 then determines if the RESULT was a "Totalout" by the controller (see 121). If so, the control unit 114 causes the lights in the "Total" area 18 to begin flashing (see 122) indicating that the house has lost. Additionally, the control unit 114 causes the buzzer 104 to ring, thus signifying a win for the players, after which the control unit 114 commences a new game.

As mentioned above, the buzzer 104 can be made to ring to signal a win, or buzz to signal a loss and the control unit 114 is operatively connected to the buzzer 104 so that it can selectively cause the buzzer 104 to ring or buzz as required for a predetermined amount of time.

With reference to the decision block 121, in the event that the result of the controller's spin was not a "Totalout", the control unit 114 then determines if the RESULT had a sum of "7" or "21" (see 123). If so, the house wins and the control unit 114 signals this by extinguishing the lights in the "Total" area 18 and causing the buzzer 104 to buzz (see 124), after which a new game begins.

With reference to the decision block 123, in the event that the sum of the RESULT is not a "7" or "21", then a "Totalup" point has been established and the control unit 114 stores the sum of the RESULT as the "Totalup" point. In order to indicate that a "Totalup" point has been established, the control unit 114 causes the "Totalup" sections 102 in the area 16 to light up together with the appropriate circular section 101 within the betting section 100 that corresponds to the "Totalup" point (see 125). The appropriate circular section 101 will remain lit until the table is reset at the beginning of a new game.

The control unit 114 then activates the reset button 56 and waits until the button 56 is pressed by the controller (see 126) which gives the dealers time to pay out and collect any bets in the one spin area 14.

Once the "Totalup" point has been established, responsibility for spinning the slot machine 24 turns over to a player and all betting fields are active. Thus, once the reset button 56 is pressed, the control unit 114 ensures all lights in the "One Spin" area 14, the "Place" bets area 16, the "Total" area 18 and the "Totalup" area 20 are on (see 127). However, the only circular section 101 which is lit up is the section 101 within the betting section 100 that corresponds to the "Totalup" point. As shown in function block 128, the controller's spinner select button 58 is then activated by the control unit 114, which then waits for the controller to press the button. This provides players with time to place new bets in the "One Spin" area 14, the "Place" bets area 16 and the compulsory wager in the "Totalup" area 20 required from players who had placed a bet in the "Total" area 18 during the controller's spin. After the select button 58 is pressed by the controller, the control unit 114 then activates one of the player spin buttons 44 to 54 etc. and waits for that button to be pressed (see 131). As previously mentioned, a player who is selected as a spinner will continue as the player spinner throughout subsequent games until that player spins a "Totalout". Thus, the control unit 114 is programmed to activate the same player's button as was activated for the previous player's spin, unless a "Totalout" occurred in the previous player's spin. In order to accomplish this, the control unit 114 stores in its memory a value or marker (a "Spinner Location") which the control unit 114 can access to indicate which player spin button 44 to 54 etc. should be selected, and as will be explained further below, this "Spinner Location" value is changed only when the RESULT of a player's spin is a "Totalout" or if the controller causes a player location to be skipped. It should be noted that the spinner select button 58 remains activated at the same time that the selected player spin button is activated. If the controller presses the spinner select button 58 while a selected player spin button is activated, the control unit 114 will deactivate the currently activated player spin button and activate the player spin button at the next sequential location at the table, and store in its memory the new "Spinner Location". This allows the controller to skip over vacant player locations at the table.

As indicated in function block 132, once the selected player's spin button is pressed, the reels of the slot machine 24 are spun in response to a control signal received from the central control unit 114, and the random RESULT is read and stored in the control unit 114, which then (see 133) calculates the "One Spin" wins and flashes and extinguishes the appropriate lights in the one spin area 14. If the result is a "Totalout" (see 134), the control unit 114 turns lights in the "Place" 16, "Total" 18 and "Totalup" 20 areas off and buzzes the buzzer 104, thus signifying a loss of bets in those areas (see 135). Additionally, as a "Totalout" has occurred on a player's spin, the control unit 114 enters a routine, see 136, wherein it selects a new "Spinner Location" for use in subsequent games and stores this new "Spinner Location" in its memory.

In the preferred embodiment, the control unit 114 is programmed to proceed sequentially around the table in selecting player spinners (subject to the controller skipping vacant spots as discussed above). After the function in block 136 is performed, a new game is then commenced.

With reference again to decision block 134, if the RESULT of the player's spin is not a "Totalout", then the control unit 114 determines if the sum of the result is equal to a "7" or "21" (see 137). If so, the control unit 114 flashes the lights in the total area 18, and rings the buzzer 104 (see 138). A new game is then commenced.

Returning again to the decision block 137, in the event that the result is not a "7" or "21", the RESULT has a sum of 8 to 20, and the control unit 114 causes the light corresponding with the sum of the RESULT to flash in the "Place" bets area 16 (see 140). The control unit 114 then determines if the sum of the RESULT has matched the "Totalup" point (see 141). If not, the control unit 114 does not commence a new game but rather loops back and repeats the steps described above starting with those shown in operation block 126. In the event that the sum of the result does equal the "Totalup" point, the control unit 114 causes lights to flash in the "Total" area 18 and the "Totalup" area 20 and rings the buzzer 104. A new game is then commenced.

It will be appreciated that if a multi-sided slot machine is desired for the apparatus 10 (as shown in FIG. 1), the readout on one side, for example the side visible to the majority of players, can be provided by the actual slot machine reels whereas the read out on the other three sides could be in the form of a video readout shown on a television screen or monitor controlled by the control unit 114. The numbers on the television screen can readily be generated from the aforementioned electronic or electromechanical devices that determine the numerical results of any spin of the reels 25 to 28. In the alternative, an electromechanical mechanism could also be used to provide the readout for each spin on the other sides.

It will be understood that instead of using a standard four reel slot machine mechanism with the apparatus 10, it is possible to use instead a known type of electronic slot machine where the results of each spin are displayed on a video screen or screens. This type of electronic slot machine is well known in the slot machine industry at this time. It will also be understood that the "slot machine" used in the preferred apparatus does not in fact have a slot, that is a slot for coins or tokens as found in standard machines of this type. Accordingly, the term "slot machine" is used herein as intended to include and does include a gambling machine of the described type that is similar to the well known machines but without any coin slot.

It will be appreciated that the slot machine 24 as described above is effectively a random output generator for randomly generating and displaying a plurality of outputs each falling within a predetermined set of possible outputs. Thus, as used herein, the term "slot machine" is intended to cover any range of devices which can perform this function including, for example, the combination of a random indicia generator and a video display terminal for displaying the output of the random indicia generator. Although as described above, the slot machine 24 includes an on-board control circuit 115, this circuit could easily be integrated into the control unit 114.

Figure 7:
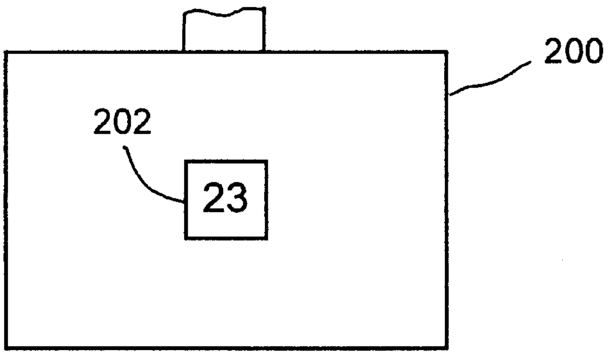
FIG. 7 is a front elevation of a slot machine of a second preferred embodiment of the gaming apparatus of the present invention.

It will be appreciated that the interactive, multi-player gambling machine system of the present invention could be constructed to allow players to play different types of games having betting combinations other than those disclosed above. For example, the slot machine 24 could have fewer or more than four reels, and each reel could include indica other than the numbers 1 to 6. For example, in a further preferred embodiment of the present invention, the gaming apparatus includes a slot machine 200 as illustrated in FIG. 7 which is substantially the same as the slot machine 24 described above however, the slot machine 200 includes only a single reel 202. The reel 202 has the indicia commonly found on a roulette reel displayed about its cylindrical circumference, namely the series of numbers 0 to 36, and "00". One of these indicia would be displayed at the end of each spin. The upper surface of the playing table 12 used with the slot machine 200 would include marked areas that are indicative of various betting options dependent on the results of a spin of the reel 202, and in particular, betting options associated with roulette. Such a gaming apparatus would allow more player participation than conventional roulette games as the responsibility for spinning the reel 202 would shift to different player positions about the table during the course of the game.

Figure 8:
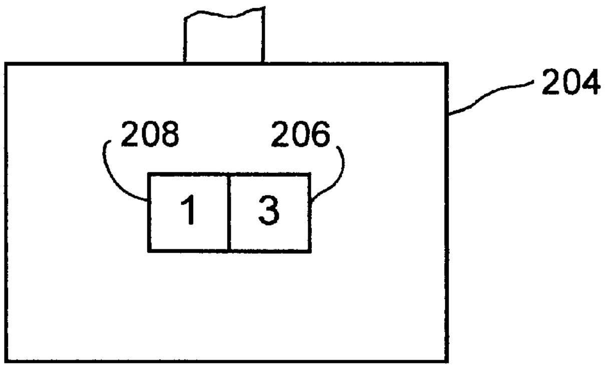
FIG. 8 is a front elevation of a slot machine of a third preferred embodiment of the gaming apparatus of the present invention.

FIG. 8 illustrates a slot machine 204 of a further preferred embodiment of the gaming apparatus of the present invention. The slot machine 204 is substantially the same as the slot machine 24 described above, however it only includes two reels 206 and 208, each having the numbers 1 to 6 displayed about their respective circular circumferences. Such a slot machine 202 would simulate the results obtained by rolling two die in a game of craps, and the upper surface of the playing table 12 used with the slot machine 204 would include marked areas that are indicative of various betting options that are associated with the game of craps.

Figure 9:
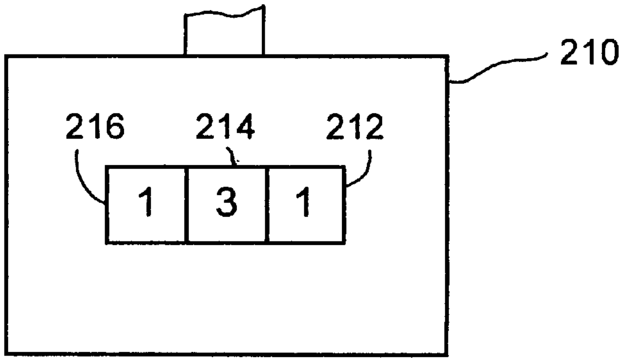
FIG. 9 is a front elevation of a slot machine of a fourth preferred embodiment of the gaming apparatus of the present invention.

FIG. 9 illustrates a slot machine 210 of still a further preferred embodiment of the gaming apparatus of the present invention. The slot machine 210 is substantially the same as the slot machine 24 described above, however, it only includes three reels 212, 214 and 216. Each of the reels 212, 214 and 216 have the series of numbers 1 to 6 displayed about their respective circular circumferences. Such a slot machine 210 would simulate the game of Sic Boe, and the upper surface of the playing table 12 used with the slot machine 210 would include marked areas indicative of the various betting options that are associated with the game of Sic Boe.

Accordingly, it will be understood that the gaming apparatus of the present invention can take a variety of different forms to allow a variety of different games to be played in which a random output generator and display means can be operated from different playing positions about a gaming table.

It will be appreciated by those skilled in the present art that various modifications and changes can be made to the described game apparatus and to the described game without departing from the spirit and scope of this invention. Accordingly, all such modifications and changes that fall within the scope of the appended claims are intended to be part of this invention.

What is claimed is:

1. A game apparatus for playing a game involving a human game controller and a number of human players comprising:

a slot machine having a plurality of reels with a plurality of indicia on each reel;

a playing table having a plurality of respective playing positions for said players and a controller's position, said table having a plurality of marked areas on a playing surface on which bets can be placed by said players, said areas being indicative of various betting options that can be won by the players and that are based on the possible results of a spin of said slot machine; and an electrical controller for operating said slot machine from any of said playing positions and from said human controller's position, wherein any selected single player and said human controller are each able to spin all of said reels simultaneously by operation of said electrical controller from their respective positions when, during the course of the game, it is a player's turn or said controller's turn to spin said reels.

2. A game apparatus according to claim 1 wherein said electrical controller for operating said slot machine includes a control unit for permitting a selected one of the players to operate said slot machine by spinning all of said reels while not permitting other players to operate said slot machine.

3. A game apparatus according to claim 2 wherein said electrical controller includes a push button at each of said playing positions and said human controller's position, and said control unit permits only a selected one of said push buttons to operate when it is a player's turn to spin said slot machine.

4. A game apparatus according to claim 1 wherein there are four of said reels with each reel having a numerical sequence displayed thereon.

5. A game apparatus according to claim 1 including lighting devices in at least some of said marked areas for providing a light signal in their respective marked areas when the lighting devices are switched to "win" indicating mode and an additional electrical system for operating appropriate ones of said lighting devices by switching them to said "win" indicating mode after a spin of said slot machine in order to indicate which betting options have won on that particular spin, said additional electrical system including a control unit for determining the results of any spin of said slot machine and generating electrical signals indicative thereof and for determining which betting options have won on the basis of the spin results.

6. A game apparatus according to claim 5 wherein the indicia on each reel of said slot machine comprise a series of single digit numbers and said control unit for determining the results include both means for determining the numerical result of any spin on each reel and means for determining the sum total of the numerical results of all of the reels arising from any such spin.

7. A game apparatus according to claim 6 wherein said slot machine has four reels with each reel having the numbers 1 to 6 displayed thereon.

8. A game apparatus according to claim 7 wherein two or more of said marked areas are divided into betting sections numbered respectively from 8 to 20, the number on each betting section representing a possible sum total of the numerical results on all of the reels arising from one spin of the slot machine and wherein one of said betting sections is lit up by a respective one of said lighting devices when the sum total of the numerical results on all of the reels arising after a spin by a player corresponds to the number on said one betting section and either a pair of numbers or a better poker combination of numbers is displayed on said reels or the number 2 is displayed on at least one of said reels after said spin.

9. A game apparatus according to claim 6 wherein each playing position has an initial bet section which is one or more of said marked areas and bets placed by players on their respective initial bet sections will win if the sum total of the numerical results of all reels arising from an initial spin of said slot machine is less than 7 or more than 21 and said bets placed by said players will lose if said sum total is 7 or 21 in which case lighting devices in said initial bet section are switched off after said initial spin.

10. A game apparatus according to claim 9 wherein each playing position has a further bet section which is one or more of said marked areas in which bets can be placed by players once a) the sum total of the numerical results of all of the reels arising from an initial spin of said slot machine is greater than 7 and less than 21, and b) either a pair of numbers or a better poker combination of numbers is displayed on said reels or the number 2 is displayed on at least one of said reels after said initial spin.

11. A game apparatus according to claim 1 including at least four different marked areas on said playing table with each different marked area being provided for a different betting option in the form of a different type of bet.

12. A game apparatus according to claim 1 wherein one or more of said marked areas is divided into betting sections including "card type" betting sections having indicia to indicate certain types of card hands that can arise from dealt cards from a conventional deck of playing cards and wherein said indicia on said reels are used to represent various possible card combinations and the results of a spin of said slot machine are used to determine if one or more of said betting sections have won.

13. A game apparatus according to claim 1 wherein said slot machine has two reels with each reel having the numbers 1 to 6 displayed as the indicia thereon.

14. A game apparatus according to claim 1 wherein said slot machine has three reels with each reel having the numbers 1 to 6 displayed as the indicia thereon.

15. A game apparatus for playing a game involving a human controller and a number of game players comprising:

a random output generator and display system for generating simultaneously a plurality of outputs selected from predetermined sets of possible outputs, and displaying said plurality of outputs;

a playing table having a number of playing positions for the game players and a position for said human controller, said table having a plurality of marked areas on a playing surface, said areas being indicative of various betting options that can be won by the players and that are based on the possible outputs of said random output generator and display system; and an electrical controller for operating said random output generator and display system from any one of said playing positions and from said human controller's position, wherein any selected single player and said human controller are each able to generate all of the plurality of outputs simultaneously by operation of said electrical controller from their respective positions when, during the course of the game, it is a player's turn or said controller's turn to operate said random output generator and display system.

16. A game apparatus according to claim 15 including lighting devices in at least some of said marked areas for providing a light signal in their respective marked areas when the lighting devices are switched to "win" indicating mode, said electrical controller including a control unit for determining which betting options have won on the basis of said plurality of outputs and operating appropriate ones of said lighting devices by switching them to said "win" indicating mode.

17. A game apparatus according to claim 16 wherein said random output generator and display system generates and then concurrently displays four outputs, each output being a single digit number, and said control unit for determining which betting options have won includes means for determining the sum total of said outputs.

18. A game apparatus according to claim 17 wherein each playing position has an initial bet section which is one or more of said marked areas and bets placed by players on said initial bet sections will win if the sum total of the numerical results of all outputs arising from an initial operation of said random output generator and display system is less than 7 or more than 21 and said bets placed by said players will lose if said sum total is 7 or 21 in which case lighting devices in said initial bet section are switched off after said initial spin.

19. A game apparatus according to claim 15 wherein said random output generator and display system includes a video display terminal for displaying said plurality of outputs.

20. A game apparatus for playing a game involving a human controller and a number of players, said game apparatus comprising:

a slot machine having four reels with each reel having a numerical sequence displayed around its circumference;

a playing table having a number of playing positions for the players and a position for the human controller, said table having a plurality of marked areas on a playing surface or which chips or markers can be placed, said areas being indicative of various betting options that can be won by each player by a spin of said slot machine, and an electrical controller for operating said slot machine from any of said playing positions and from said human controller's position, wherein any selected single player and said controller are each able to spin all four reels simultaneously by operation of said electrical controller from their respective positions and the numerical indicia displayed by the four reels at the completion of each spin can match one or more of said betting options shown on the marked areas.

21. A game apparatus according to claim 20 wherein one or more of said marked areas is divided into betting sections including card-type betting sections having indicia to indicate certain types of card hands that can arise from dealt cards from a conventional deck of playing cards and wherein said indicia on said reels are used to represent various possible card combinations and the results of a spin of said slot machine are used to determine if one or more of said betting sections have won.

22. A game apparatus comprising:

a slot machine having a plurality of reels with a plurality of numerical indicia on each reel; and a playing table for a plurality of game players, said table having a plurality of marked areas on a playing surface on which chips or markers can be placed, said areas being indicative of various betting options that can be won by a player by a spin of said slot machine, and an electrically operated system for determining the numerical result of any spin on each reel and for determining the sum total of the numerical results of all of the reels arising from any such spin, wherein the indicia displayed by the reels at the completion of each spin can match one or more of said betting options shown on the marked areas.

23. A game apparatus according to claim 22 including an electrical controller for operating said slot machine from any one of a plurality of different playing positions around said table.

24. A game apparatus according to claim 23 wherein said slot machine has four reels and the indicia on each reel comprises a series of single digit numbers ranging from 1 to 6.

25. A game apparatus according to claim 22 including at least four different marked areas on said playing table with each different marked area being provided for a different betting option in the form of a different type of bet.

26. A game apparatus according to claim 24 wherein two or more of said marked areas are divided into betting sections -numbered respectively from 8 to 20, the number of each betting section representing a possible sum total of the numerical results of all of the reels arising from one spin of the slot machine.

27. A game apparatus comprising:

a random output generator and display system for generating at least one output from a predetermined set of possible outputs, and displaying said output;

a playing table having a number of playing positions for game players, said table having a plurality of marked areas on a playing surface, said areas being indicative of various betting options that can be won by the players and that are based on the possible outputs of said random output generator and display system;

lighting devices in at least some of said marked areas for providing a light signal in their respective marked areas when the lighting devices are switched to a "win" indicating mode; and an electrical controller for operating said random output generator and display system from any of said playing positions around said table, said controller including a control unit for determining which betting options have won on the basis of said at least one output and operating an appropriate one or more of said lighting devices by switching it or them to said "win" indicating mode.

28. A game apparatus according to claim 27 wherein said random output generator and display system generates a plurality of outputs selected from predetermined sets of possible outputs, and displays said plurality of outputs.

29. A game apparatus comprising:

a slot machine having a plurality of reels with a plurality of indicia on each reel; and a playing table for a plurality of game players, said table having a plurality of marked areas on a playing surface on which chips or markers can be placed, said areas being indicative of various betting options that can be won by a player by a spin of said slot machine, one or more of said marked areas being divided into betting sections including card-type betting sections having indicia to indicate certain types of card hands that can arise from dealt cards from a conventional deck of playing cards, wherein said indicia on said reels are used during the playing of a game to represent various possible card combinations and can match one or more of said betting options shown on the marked areas and the results of a spin of said slot machine are used to determine if one or more of said betting sections have won.

* * * * *